(12) United States Patent
Osawa et al.

(10) Patent No.: US 9,658,054 B2
(45) Date of Patent: May 23, 2017

(54) OPTICAL MEASURING APPARATUS

(71) Applicant: HITACHI MEDIA ELECTRONICS CO., LTD., Kanagawa (JP)

(72) Inventors: Kentaro Osawa, Tokyo (JP); Koichi Watanabe, Tokyo (JP); Daisuke Tomita, Tokyo (JP)

(73) Assignee: HITACHI-LG DATA STORAGE, INC., Tokyo (JP)

( * ) Notice: Subject to any disclaimer, the term of this patent is extended or adjusted under 35 U.S.C. 154(b) by 192 days.

(21) Appl. No.: 14/074,851

(22) Filed: Nov. 8, 2013

(65) Prior Publication Data
US 2014/0204388 A1  Jul. 24, 2014

(30) Foreign Application Priority Data

Jan. 24, 2013 (JP) .................................. 2013-011408
Sep. 10, 2013 (JP) .................................. 2013-187398

(51) Int. Cl.
*G01B 11/02* (2006.01)
*G01B 9/02* (2006.01)

(52) U.S. Cl.
CPC ..... *G01B 9/02091* (2013.01); *G01B 9/02063* (2013.01); *G01B 9/02064* (2013.01);
(Continued)

(58) Field of Classification Search
CPC .............. G01B 9/02091; G01B 9/0209; G01B 9/02063; G01B 9/02064; G01B 2290/35;
(Continued)

(56) References Cited

U.S. PATENT DOCUMENTS 5,321,501 A * 6/1994 Swanson ............ A61B 1/00096
250/227.27
8,204,300 B2 * 6/2012 Sugita .................... A61B 3/102
356/479

(Continued)

FOREIGN PATENT DOCUMENTS

CN          101234015 A      8/2008
CN          102034496 A      4/2011
(Continued)

OTHER PUBLICATIONS

Office Action, mailed Jun. 25, 2015, which issued during the prosecution of Chinese Patent Application No. 201310573943.9, which corresponds to the present application.

(Continued)

*Primary Examiner* — Tarifur Chowdhury
*Assistant Examiner* — Jonathon Cook
(74) *Attorney, Agent, or Firm* — Baker Botts L.L.P.

(57) ABSTRACT

Provided is a compact, low-cost optical measuring apparatus capable of acquiring an image of a target to be measured without moving a mirror or using a wavelength-scanning light source or beam splitter. A laser beam emitted from a light source is split into first and second beams, and the first beam is focused as a signal beam onto the target by a lens for irradiation purposes, while the second beam is reflected as a reference beam by a mirror without irradiating the target. Then, a signal beam reflected by or scattered by the target is multiplexed with the reference beam and then enters interference optics, whereby three or more interference beams with different phases are generated and detected by photodetectors. Then, the detection signals are operated by a signal processing unit. During the measurement, the focus position of the first beam is moved at least in the optical axis direction.

14 Claims, 10 Drawing Sheets

(52) U.S. Cl.
CPC ...... *G01B 2290/35* (2013.01); *G01B 2290/45* (2013.01); *G01B 2290/65* (2013.01); *G01B 2290/70* (2013.01)

(58) Field of Classification Search
CPC ............ G01B 2290/45; G01B 2290/65; G01B 2290/70
USPC .................................................. 356/479, 497
See application file for complete search history.

(56) References Cited

U.S. PATENT DOCUMENTS

| | | | | |
|---|---|---|---|---|
| 2008/0151256 | A1* | 6/2008 | Kikawa et al. | 356/496 |
| 2010/0141959 | A1* | 6/2010 | Kuchel | 356/521 |
| 2011/0080815 | A1* | 4/2011 | Mikami et al. | 369/47.19 |
| 2012/0300217 | A1 | 11/2012 | Yuasa | |
| 2013/0188139 | A1* | 7/2013 | Sato et al. | 351/206 |
| 2014/0016095 | A1 | 1/2014 | Takai | |

FOREIGN PATENT DOCUMENTS

| | | |
|---|---|---|
| JP | H09-218016 A | 8/1997 |
| JP | 2007-524075 A | 8/2007 |
| JP | 2010-167253 A | 9/2010 |
| JP | 2010-259698 A | 11/2010 |
| JP | 2010-268990 A | 12/2010 |
| JP | 2011-218155 | 1/2011 |
| JP | 2011-022589 A | 2/2011 |
| JP | 2011-076695 A | 4/2011 |
| JP | 2012-213489 A | 11/2012 |
| WO | WO 2012/132339 A2 | 10/2012 |

OTHER PUBLICATIONS

Office Action, mailed Dec. 20, 2016, which issued during the prosecution of Japanese Application No. 2013-187398, which corresponds to the present application.

* cited by examiner

OPTICAL MEASURING APPARATUS

CLAIM OF PRIORITY

The present application claims priority from Japanese patent applications JP 2013-011408 filed on Jan. 24, 2013 and JP 2013-187398 filed on Sep. 10, 2013, the content of which is hereby incorporated by reference into this application.

BACKGROUND

1. Technical Field

The present invention relates to an optical tomographic observation apparatus and an optical tomographic observation method.

2. Background Art

In recent years, optical coherence tomography (OCT) has been drawing attention that acquires an image reflecting the surface structure or the inner structure of a target to be measured, using a light beam (See Patent Document 1). As the OCT is not invasive on the human body, it is expected to be applied to the medical field and the biological logical field, in particular. In the ophthalmological field, apparatuses for forming images of fundus or corneas have been put into practical use. In the OCT, a light beam from a light source is split into two: a signal beam to irradiate a target to be measured, and a reference beam to be reflected by a reference beam mirror without irradiating the target to be measured, and then a reflected signal beam from the target to be measured is multiplexed with and is caused to interfere with the reference beam, whereby an interference signal is obtained.

The OCT is broadly divided into the time domain OCT and the Fourier domain OCT depending on the method of moving a measurement position in the optical axis direction (hereinafter referred to as z-scan). FIG. 1 shows a schematic diagram of the optics of the time domain OCT. In this scheme, z-scan is performed by using a low coherence light source as a light source and moving a reference beam mirror during the measurement. Accordingly, only the components in a signal beam that have the same optical path lengths as the reference beam will interfere with the reference beam, whereby a detection signal such as the one shown in FIG. 2 is obtained. When envelope detection is performed on the signal shown in FIG. 2, a desired signal such as the one shown in FIG. 3 is obtained through demodulation.

Meanwhile, the Fourier domain OCT is further divided into the wavelength-scanning OCT and the spectral domain OCT. In the wavelength-scanning OCT, z-scan is performed by using a wavelength-scanning light source capable of causing the wavelength of an output beam to scan, and causing the wavelength to scan during the measurement. When Fourier transform is performed on the wavelength dependence of the detected interference beam intensity (i.e., an interference spectrum), a desired signal is obtained through demodulation.

In the spectrum domain OCT, the following corresponds to the z-scan: using a broadband light source for a light source, splitting a generated interference beam using a beam splitter, and detecting the interference beam intensity (i.e., an interference spectrum) for each wavelength component. When Fourier transform is performed on the obtained interference spectrum, a desired signal is obtained through demodulation.

In the conventional OCT apparatuses such as those described above, the spatial resolution in the depth direction is determined by the spectral bandwidth of the light source. Thus, an increase in the resolution has been attempted by widening the spectral bandwidth.

PATENT DOCUMENTS

Patent Document 1: JP 2011-218155 A

SUMMARY

The conventional OCT apparatuses described above, however, have the following problems. In the time domain OCT, a reference beam mirror is mechanically moved to perform z-scan. Thus, angular deviation would occur at the reference beam mirror. Accordingly, there is a problem in that a reference beam would be displaced in the optical axis direction, and the interference amplitude would decrease, which could result in a decreased S/N ratio. Further, when a shorter-coherence light source is used to increase the spatial resolution in the optical axis direction, the number of waves that are included in the envelope will decrease in the interference waveform such as the one shown in FIG. 2. That is, as the frequency at which the amplitude of an interference signal changes (i.e., the frequency of the envelope) becomes closer to the frequency at which the interference signal oscillates, there is a problem in that demodulation of a signal through envelope detection becomes difficult to perform. Further, in the Fourier domain OCT, a light source or a beam splitter to sweep the wavelength at high speed is necessary to perform the z-scan. As both the light source and the beam splitter are expensive and large, there is a problem in that the cost and size of the OCT apparatus will increase correspondingly.

In order to solve the aforementioned problems, the present invention splits a laser beam emitted from a light source into two to obtain a first beam and a second beam, and focuses the first beam as a signal beam onto a target to be measured for irradiation purposes. The second beam is used as a reference beam without irradiating the target to be measured. Then, a signal beam reflected by or scatted by the target to be measured is multiplexed with the reference beam, whereby three or more interference beams with different phases are generated and detected. The focus position of the first beam is moved in the optical axis direction by moving a lens or the like.

Accordingly, z-scan can be performed without moving the position of the reference beam mirror, unlike in the conventional time domain OCT. Thus, it is possible to avoid a tilt of the reference beam mirror that would otherwise occur with a mechanical movement of the reference beam mirror. Further, as the z-scan can be performed without using a wavelength-scanning light source or a beam splitter, it is possible to provide an OCT apparatus that is more compact and less expensive than the apparatus of the conventional Fourier domain OCT. Further, as three or more interference beams with different phases are detected, operating such detection signals can acquire a stable signal that is independent of the interference phase. That is, it is possible to acquire an accurate envelope of the interference waveform shown in FIG. 2 without using envelope detection. Accordingly, it is possible to demodulate even a signal that would not be able to be demodulated through the envelope detection used for the time domain OCT.

As an example, the numerical aperture of a lens that focuses the first beam onto the target to be measured is set to be greater than or equal to 0.4. Accordingly, it is possible to achieve the spatial resolution in the optical axis direction that is greater than or about equal to the spatial resolution in the optical axis direction of the conventional OCT apparatus, without using a broadband light source or a wavelength-scanning light source.

As an example, the coherence length of a laser beam is set to be greater than or equal to a change in the optical path length of the signal beam that would occur due to the movement of the lens in the optical axis direction or the like.

Accordingly, it is possible to suppress a decrease in the interference amplitude even when an optical path length difference is generated between the signal beam and the reference beam as a result of the focus position having been moved with the lens moved in the optical axis direction or the like. Thus, the position of the reference beam mirror need not be moved to adjust the optical path length difference.

As an example, four interference beams are generated by the interference optics, and the interference phases of the four interference beams differ from one another by substantially 90°. Then, pairs of interference beams are detected by a current differential detector, each pair having a phase difference of substantially 180°.

Accordingly, operating such detection signals can acquire a signal that is independent of the interference phases, and thus, it is possible to demodulate even a signal that would not be able to be demodulated through the envelope detection used for the conventional time domain OCT.

As an example, the focus position of the first beam is repeatedly moved in the optical axis direction by moving the lens or the like.

Accordingly, it is possible to, when the target to be measured is moved closer to the lens to conduct measurement, easily determine if the target to be measured has moved closer to a range in which measurement can be conducted by moving the focus position of the first beam by moving the lens or the like, by detecting the presence or absence of a beam reflected by the surface of the target to be measured.

As an example, a cover glass is disposed between the lens and the target to be measured, and the focus position of the first beam is repeatedly moved in the optical axis direction, while the surface of the cover glass is included in the measurement target area.

Accordingly, it is possible to correct curvature of an image that has been generated due to a minute movement of the target to be measured or distortion of the lens movement path during the measurement, with reference to the surface position of the cover glass. Further, it is also possible to avoid damage to the lens that would otherwise occur if the lens touches the target to be measured.

As an example, in an area around the return position of the repetitive movement of the focus position of the first beam in the optical axis direction, the laser beam intensity is set smaller than when the focus position is outside the area around the return position. Alternatively, the laser power is set to zero at the return position of the repetitive movement of the focus position in the optical axis direction.

Accordingly, it is possible to suppress damage to the target to be measured that would otherwise occur due to exposure to the laser beam in an area around an end of the measurement region in the optical axis direction.

As an example, the laser beam is subjected to pulse modulation so that light emission occurs in synchronism with the signal acquisition timing.

Accordingly, damage to the target to be measured that would otherwise occur due to exposure to the laser beam can be suppressed.

As an example, an optical observation unit is provided by housing optics, which multiplex a signal beam with a reference beam to generate a combined beam, in a single housing; a photodetector unit is provided by housing an interferometer, which generates three or more interference beams with different phases, a photodetector, and a signal processing unit in another housing; and the optical observation unit and the photodetector unit are connected with a polarization maintaining optical fiber.

Accordingly, measurement can be easily conducted by moving only the compact optical observation unit closer to the target to be measured, and if one of the units fails, only that unit should be replaced, whereby maintenance management of the apparatus becomes easier.

Further, as an example, the optical path length of the reference beam is modulated at a faster speed than a change in the optical path length of the signal beam that would occur due to the movement of the focus position of the first beam.

Accordingly, an OCT signal can be obtained with less detectors.

Further, as an example, a spherical aberration correction unit is provided on the optical path of the signal beam.

Accordingly, it is possible to suppress a decrease in the signal intensity and degradation of the spatial resolution at a deep portion of the target to be measured, whereby it is possible to obtain a clear image of even a deep portion of the target to be measured.

The present invention can provide an optical measuring apparatus capable of acquiring a tomographic image of a target to be measured without the need to move a reference beam mirror or use a wavelength-scanning light source or a beam splitter.

Other problems, configurations, and advantages will become apparent from the following description of embodiments.

DETAILED DESCRIPTION

Hereinafter, embodiments of the present invention will be described with reference to the drawings.

Embodiment 1

Figure 1:
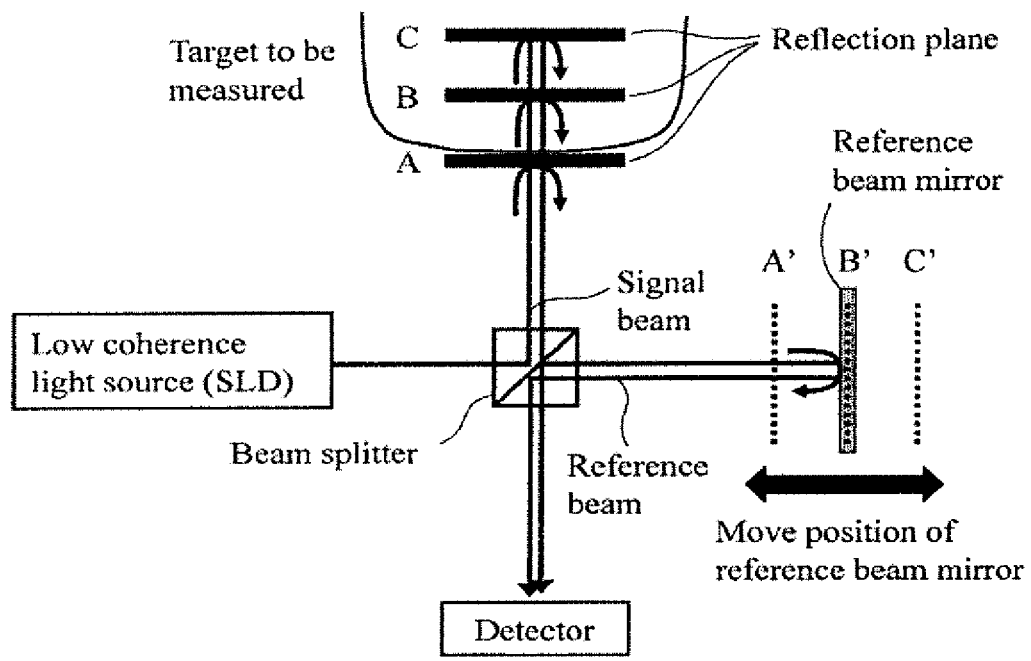
FIG. 1 is a schematic diagram representing the configuration of a conventional OCT apparatus.
Figure 2:
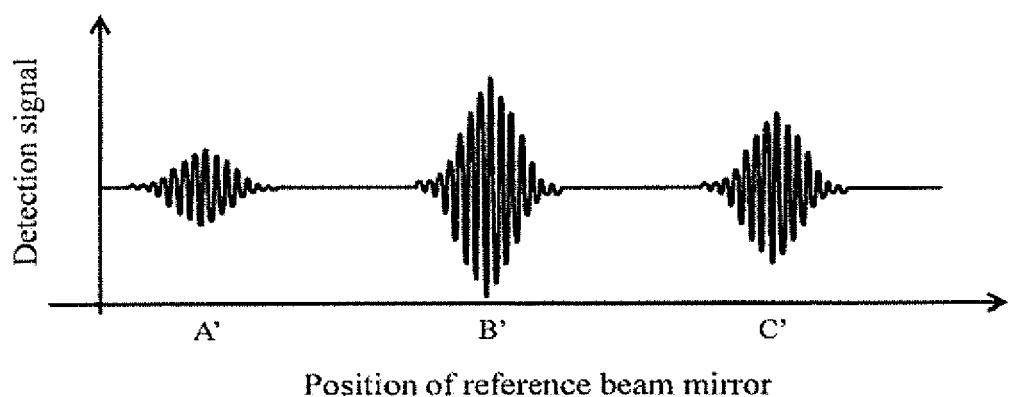
FIG. 2 is an illustration diagram of an interference signal detected with the conventional OCT apparatus.
Figure 3:
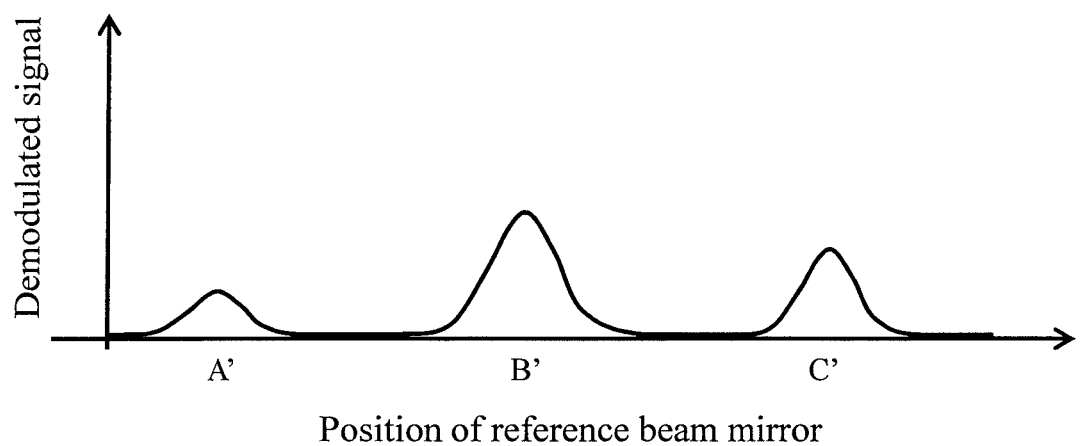
FIG. 3 is an illustration diagram of a demodulated signal of the conventional OCT apparatus.
Figure 4:
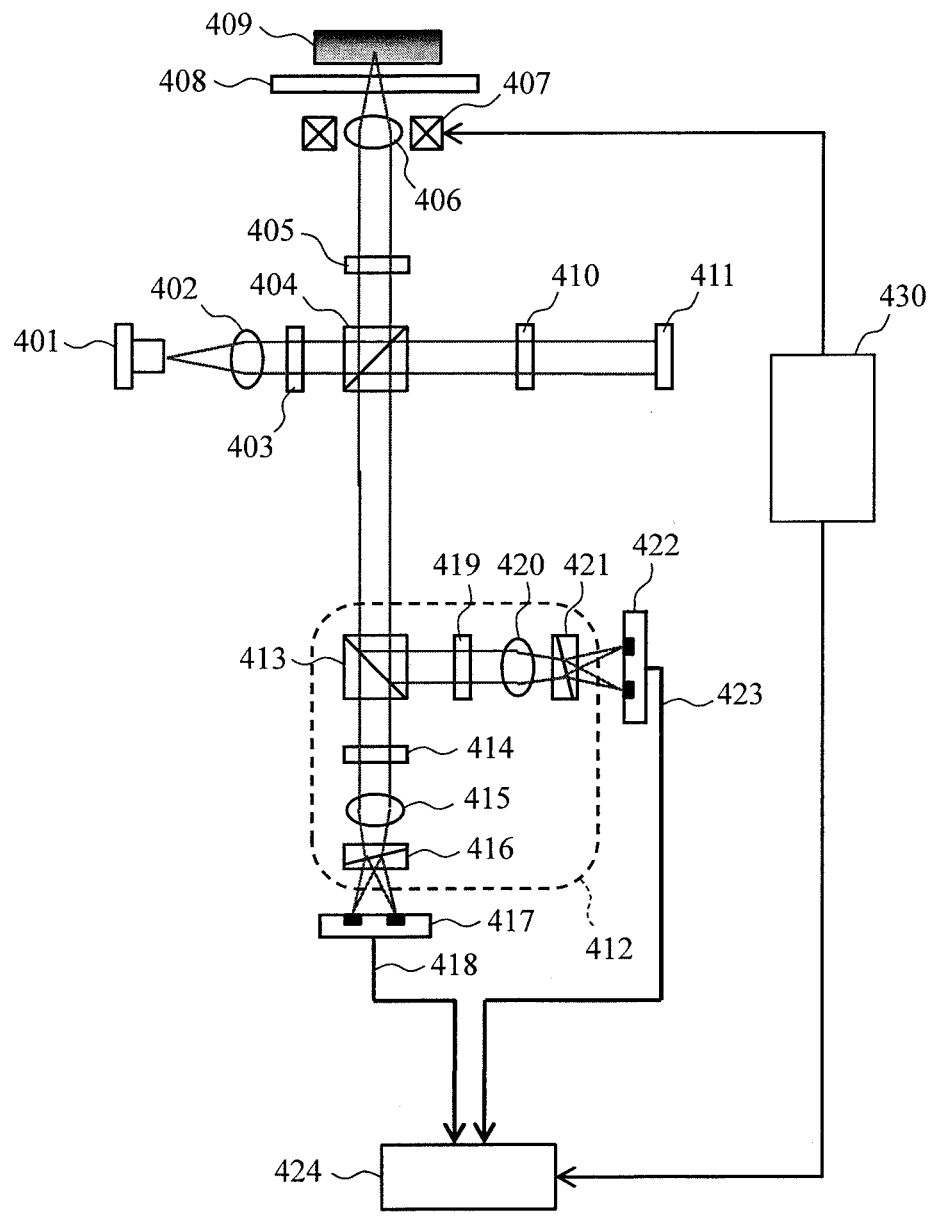
FIG. 4 is a schematic diagram showing an exemplary configuration of an optical measuring apparatus of the present invention.

FIG. 4 is a schematic diagram showing the basic embodiment of an optical measuring apparatus in accordance with the present invention.

A laser beam with single-wavelength components emitted from a light source 401 is converted into a collimated beam by a collimator lens 402, and is subjected to rotary polarization by a λ/2 plate 403 capable of adjusting the optical axis direction, and is further split into two: a signal beam and a reference beam by a polarization beam splitter 404. The signal beam passes through a λ/4 plate 405 at which the optical axis direction is set to about 22.5° with respect to the horizontal direction so that the signal beam is converted from the s-polarized beam into a circularly polarized beam, and is then focused by a lens 406 with a numerical aperture of greater than or equal to 0.4. Then, the signal beam passes through a cover glass 408, and irradiates a target to be measured 409. Herein, the lens 406 is moved at least in the z direction by a lens actuator 407 under control of a control unit 430, whereby the focus position (i.e., the measurement position) of the signal beam by the lens 406 is moved. A signal beam reflected by or scattered by the target to be measured is converted into a collimated beam by the lens 406, and is converted from the circularly polarized beam into a p-polarized beam by a λ/4 plate 405. Then, the signal beam enters the polarization beam splitter 404.

Meanwhile, the reference beam passes through a λ/4 plate 410, and is converted from the p-polarized beam into a circularly polarized beam. Then, the reference beam becomes incident on and is reflected by a stationary mirror 411, and is converted from the circularly polarized beam into a s-polarized beam, and then enters the beam splitter 404.

The signal beam and the reference beam are multiplexed by the polarization beam splitter 404, whereby a combined beam is generated. The combined beam is guided to interference optics 412 that include a half beam splitter 413, a λ/2 plate 414, a λ/4 plate 419, condenser lenses 415 and 420, and Wollaston prisms 416 and 421.

The combined beam that has entered the interference optics 412 is split into two: a transmitted beam and a reflected beam by the half beam splitter 413. The transmitted beam passes through a λ/2 plate 414 at which the optical axis is set to about 22.5° with respect to the horizontal direction, and is focused by a condenser lens 415, and is further split into two by a Wollaston prism 416, whereby a first interference beam and a second interference beam having a phase difference of 180° are generated. The first interference beam and the second interference beam are detected by a current differential photodetector 417, whereby a signal 418 that is proportional to the intensity difference between the first interference beam and the second interference beam is output.

Meanwhile, the reflected beam passes through the λ/4 plate 419 at which the optical axis is set to about 45° with respect to the horizontal direction, and is focused by the condenser lens 420, and is further split into two by a Wollaston prism 421, whereby a third interference beam and a fourth interference beam having a phase difference of 180° are generated. The third interference beam and the fourth interference beam are detected by a current differential photodetector 422, whereby a signal 423 that is proportional to the intensity difference between the third interference beam and the fourth interference beam is output. The thus generated signals 418 and 423 are input to a signal processing unit 424 and are operated, whereby a signal that is proportional to the amplitude of the signal beam is obtained.

The operation principle mentioned above will be specifically described using formulae. Provided that the Jones vector of the combined beam at a time point when it enters the interference optics 412 is represented as follows:

$$\begin{pmatrix} E_{sig} \\ E_{ref} \end{pmatrix}, \tag{1}$$

the Jones vector of the combined beam that has passed through the half beam splitter 413 and has further passed through the λ/2 plate 414 is represented as follows.

$$\begin{pmatrix} 1/\sqrt{2} & -1/\sqrt{2} \\ 1/\sqrt{2} & 1/\sqrt{2} \end{pmatrix} \begin{pmatrix} E_{sig}/\sqrt{2} \\ E_{ref}/\sqrt{2} \end{pmatrix} = \frac{1}{2} \begin{pmatrix} E_{sig} - E_{ref} \\ E_{sig} + E_{ref} \end{pmatrix} \tag{2}$$

The combined beam represented by Formula (2) is split into two: p-polarized components and s-polarized components by the Wollaston prism 416, which are then differentially detected by the current differential photodetector 417. Thus, the detection signal 418 is represented as follows.

$$I = \frac{1}{4}|E_{sig} + E_{ref}|^2 - \frac{1}{4}|E_{sig} - E_{ref}|^2 \tag{3}$$
$$= |E_{sig}||E_{ref}|\cos(\theta_{sig} - \theta_{ref})$$

Herein, $\theta_{sig}$ and $\theta_{ref}$ are the phases for when the complex numbers $E_{sig}$ and $E_{ref}$ are represented on the polar coordinates. For simplicity purposes, the conversion efficiency of the detector is assumed to be 1.

Meanwhile, the Jones vector of the combined beam that has been reflected by the half beam splitter 413 and has further passed through the λ/4 plate 419 is represented as follows.

$$\begin{pmatrix} i/\sqrt{2} & 1/\sqrt{2} \\ 1/\sqrt{2} & i/\sqrt{2} \end{pmatrix} \begin{pmatrix} E_{sig}/\sqrt{2} \\ E_{ref}/\sqrt{2} \end{pmatrix} = \frac{1}{2} \begin{pmatrix} i(E_{sig} - iE_{ref}) \\ E_{sig} + iE_{ref} \end{pmatrix} \tag{4}$$

The combined beam represented by Formula (4) is split into two: p-polarized components and s-polarized components by the Wollaston prism 421, which are then differentially detected by the current differential photodetector 422. Thus, the detection signal 423 is represented as follows.

$$Q = \frac{1}{4}|E_{sig} + iE_{ref}|^2 - \frac{1}{4}|E_{sig} - iE_{ref}|^2 \tag{5}$$
$$= |E_{sig}||E_{ref}|\sin(\theta_{sig} - \theta_{ref})$$

The following operation is performed on the above outputs with the signal processing unit 424, whereby a signal that is independent of the phase and is proportional to the absolute value of the amplitude of the signal beam is obtained.

$$|E_{sig}||E_{ref}|=\sqrt{P^2+Q^2} \qquad (6)$$

Next, a lens movement method and a laser intensity control method will be described. Hereinafter, the optical axis direction will be indicated by z-direction, a direction that is parallel with the paper surface will be indicated by x-direction, and a direction that is perpendicular to the paper surface will be indicated by y-direction.

Figure 5:
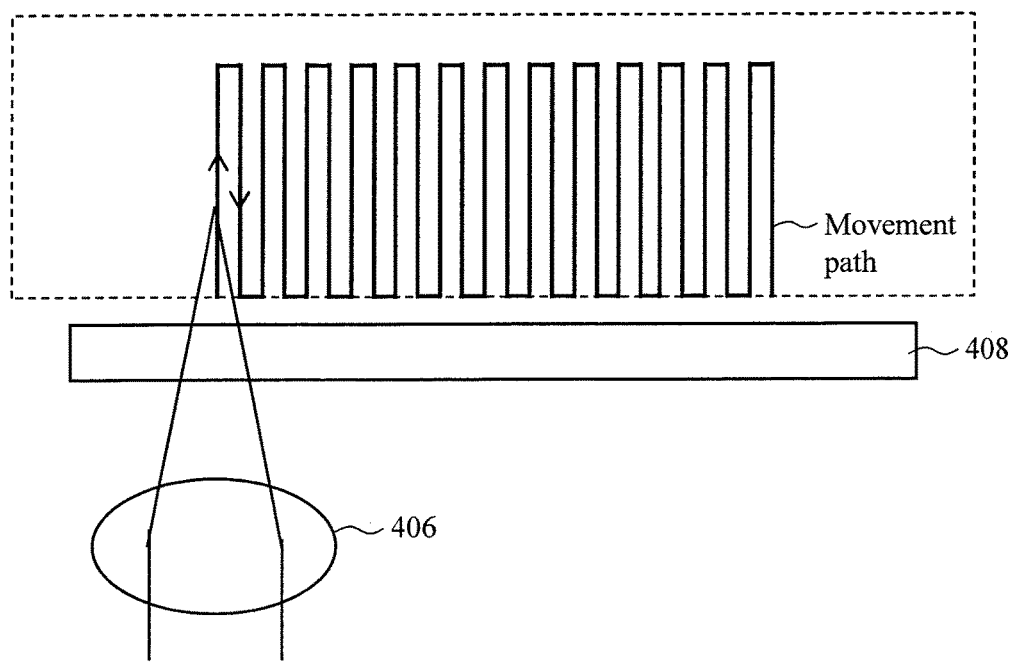
FIG. 5 is a schematic diagram showing an ideal movement path of the focus position.
Figure 6:
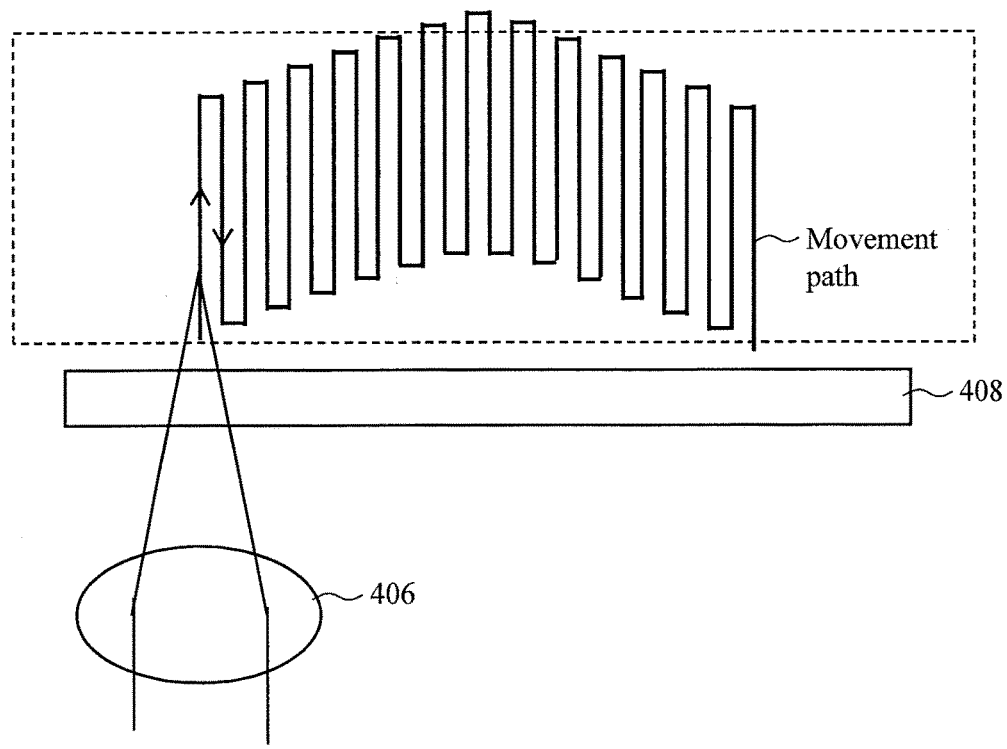
FIG. 6 is a schematic diagram showing an example of the actual movement path of the focus position.
Figure 7:
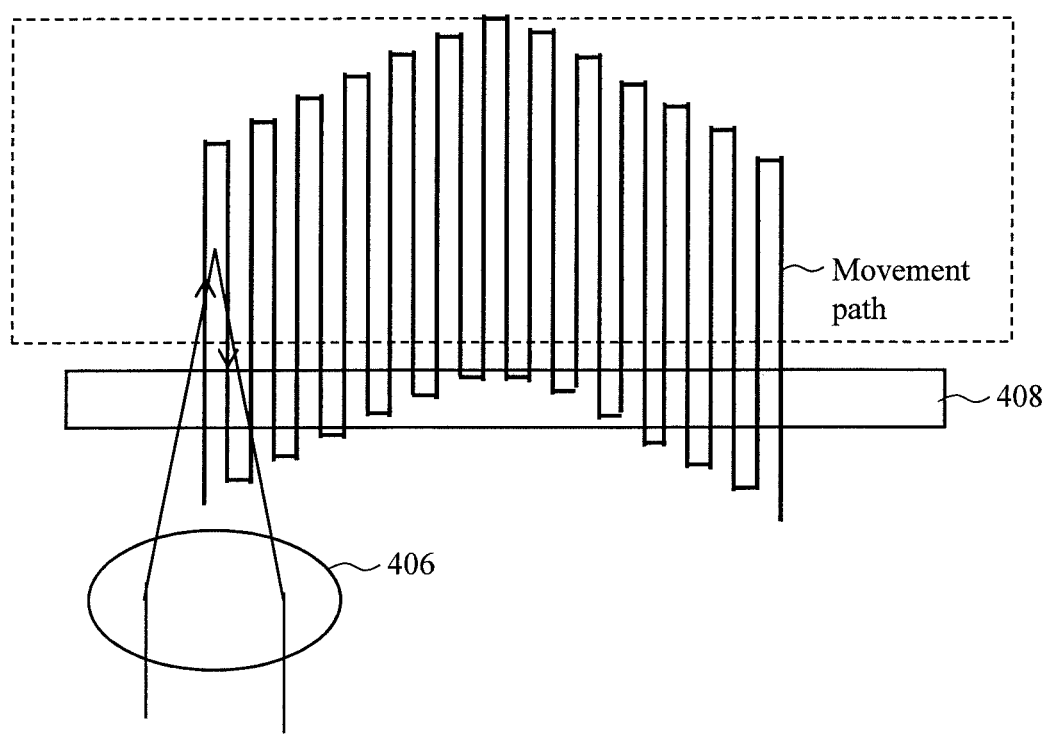
FIG. 7 is a schematic diagram showing an example of the movement path of the focus position of the optical measuring apparatus of the present invention.

A two-dimensional image (zx image) of a target to be measured can be obtained by, for example, repeatedly moving the lens 406 in the z-direction by controlling the lens actuator 407 of the scanning unit with the control unit 439, and moving the lens 6 by a predetermined amount in the x-direction (i.e., about a spot diameter of the focused signal beam) each time the lens 406 reaches the return position. FIG. 5 shows an ideal movement path of the focus position of the signal beam at this time. However, as the lens actuator does not always move linearly, the lens may be tilted at an end of a stroke in the xy direction, and thus the actual movement path may become distorted as shown in FIG. 6. When the movement path is distorted as described above, the acquired image will be curved and a correct image cannot be obtained. Thus, in this embodiment, the surface of the cover glass 408 is included in the measurement area (i.e., the scanning range in the optical direction) as shown in FIG. 7. Accordingly, it becomes possible to acquire a correct image by acquiring a signal from the surface of the cover glass 408 each time scanning in the z-direction is performed and correcting a curved image so that the surface of the cover glass 408 becomes flat.

A three-dimensional image of the target to be measured can be acquired by, after acquiring the zx image with the aforementioned scanning method, repeating the procedures of moving the lens in the y-direction by a predetermined amount (i.e., about a spot diameter of the focused signal beam). Alternatively, it is also possible to, after acquiring the zx image by moving the lens, repeat the procedures of moving the target to be measured or the entire OCT apparatus in the y-direction using a motor-driven stage or the like. Although the z-scan is performed by moving the lens 406 in this embodiment, it is also possible to move the focus position by inserting at least one lens in front of the lens 406 and moving the inserted lens.

The movement speed of the focus position is relatively slow in an area around the return position of the scanning. Thus, there is a possibility that the amount of exposure to light may increase in that area and thus the damage to the target to be measured may increase. To suppress such damage, in this embodiment, the laser intensity at the return position of the scanning is set relatively low. It is also possible to set the laser power at the return position of the scanning to zero. Herein, as another method of suppressing the damage to the target to be measured due to the exposure to light, it is also possible to apply pulse modulation to the laser beam so that light emission occurs in synchronism with the signal acquisition timing. Accordingly, as the exposure does not occur in a period other than when a signal is acquired, it is possible to reduce the average amount of exposure.

In this embodiment, the measurement position is moved in the optical axis direction by moving the lens. Thus, it is not necessary to move a reference beam mirror unlike in the time domain OCT. Accordingly, it is possible to avoid a tilt of the reference beam mirror that would otherwise occur due to a mechanical movement of the reference beam mirror. Further, as a wavelength-scanning light source or a beam splitter is not necessary unlike in the Fourier domain OCT, the apparatus can be provided with a compact size and low cost.

Further, a laser source is used that emits a longer coherence laser beam than a change in the optical path length of the signal beam that would occur due to the movement of the lens in the optical axis direction. Accordingly, even when an optical path length difference is generated between the signal beam and the reference beam as a result of the lens having been moved in the optical axis direction, it is possible to suppress a decrease in the interference amplitude.

Further, four interference beams that differ from one another in the interference phase of the signal beam and the reference beam by an integral multiple of about 90° are generated and detected, and an operation is performed on such detection signals to obtain a signal represented by Formula (6) that is independent of the interference phase. Thus, it is possible to demodulate even a signal that would not be able to be demodulated through the envelope detection used for the conventional time domain OCT.

Embodiment 2

Figure 8:
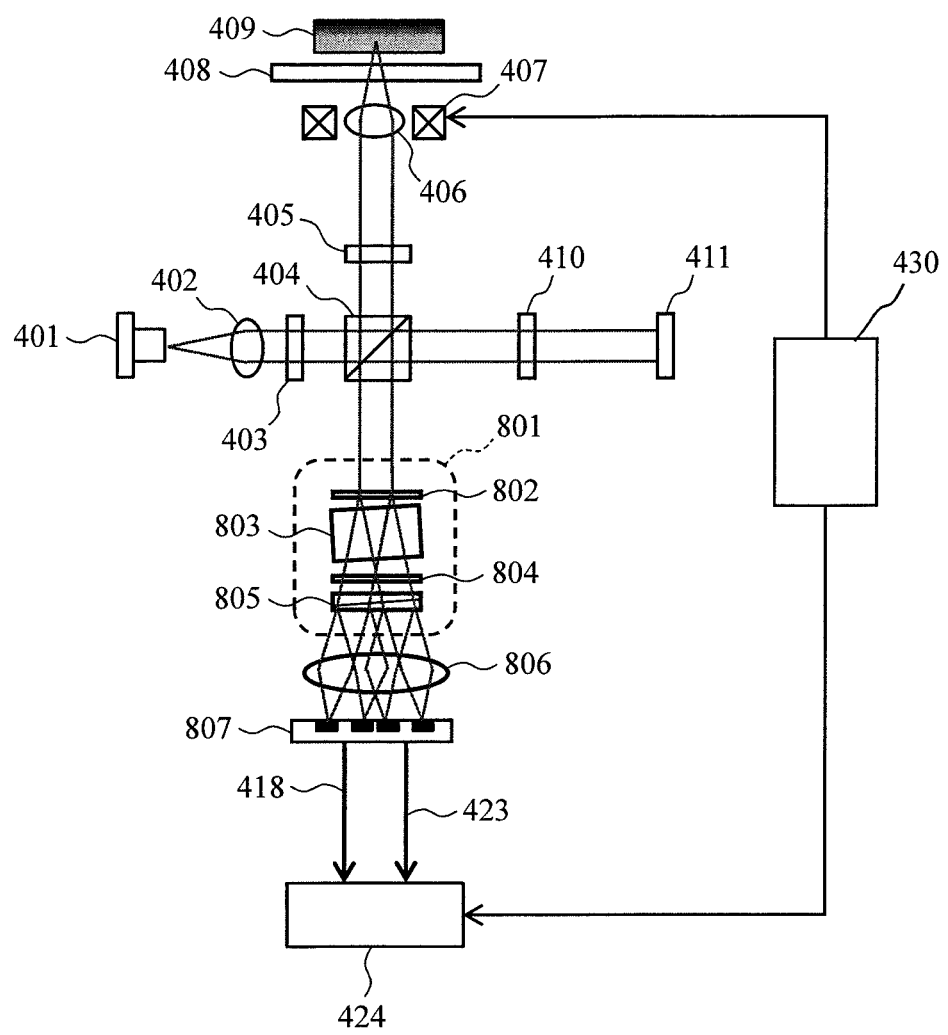
FIG. 8 is a schematic diagram showing another exemplary configuration of the optical measuring apparatus of the present invention.

FIG. 8 is a schematic diagram showing another embodiment of the optical measuring apparatus in accordance with the present invention. It should be noted that members that are the same as those shown in FIG. 4 are denoted by the same reference numerals, and description thereof will be omitted.

This embodiment is the same as Embodiment 1 in the structure in which a laser beam emitted from a light source 401 is split into two: a signal beam and a reference beam, and the split beams are multiplexed again to generate a combined beam. The generated combined beam is first split into±primary diffraction rays by a diffraction grating 802, whereby a first split combined beam and a second split combined beam are generated. Such combined beams pass through a phase plate 803 that is arranged so that the phase difference between the s-polarized components and the p-polarized components of the first split combined beam differs from the phase difference between the s-polarized components and the p-polarized components of the second split combined beam by 90°. After that, the polarization directions of the beams are rotated by a λ/2 plate 804 that is set at about 22.5° with respect to the horizontal direction, and then, the beams are subjected to polarization split by a Wollaston prism 805, whereby four interference beams whose interference phases differ from one another by substantially 90° are generated. Such interference beams are focused by a condenser lens 806, and pairs of interference beams are differentially detected by a detector 807, each pair having a phase difference of 180°. The detection signals are operated by a signal processing unit 424, whereby a signal that is independent of the phase and is proportional to the absolute value of the amplitude of the signal beam is obtained. The functions of the interference optics 801 are the same as those of the interference optics 412 in Embodiment 1. Thus, description thereof will be omitted. In this embodiment, the interference optics are more compact than those in Embodiment 1. Thus, a more compact OCT apparatus can be provided.

In Embodiment 1 and the embodiment shown in FIG. 8, information on the amplitude and the phase of each polarized component of the signal beam is acquired from the intensities of four interference beams. As the parameters that determine the intensities of interference beams are the following three: (1) signal beam intensity, (2) reference beam intensity, and (3) the phase difference between the signal beam and the reference beam, it is in principle possible to acquire information on the amplitude and the phase by detecting the intensities of three or more interference beams with different phases.

Figure 9:
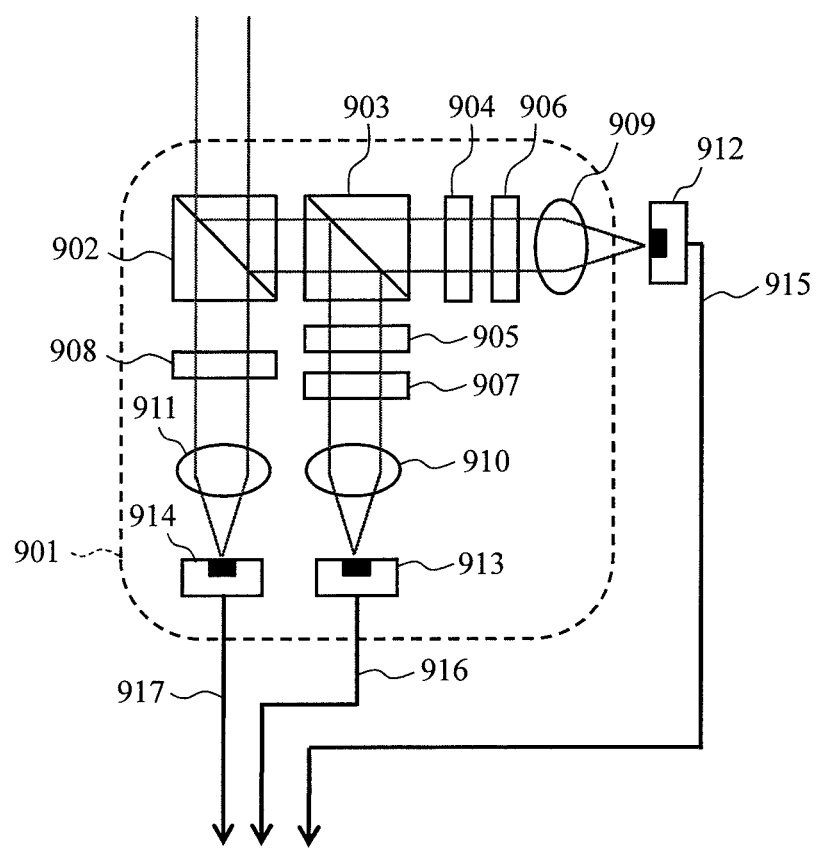
FIG. 9 is a diagram showing an example of interference optics of the optical measuring apparatus of the present invention.

Accordingly, interference optics 901 shown in FIG. 9, for example, can be used as the interference optics. Hereinafter, the function of the interference optics 901 will be described. A combined beam that has entered the interference optics 901 is split into three: a first split combined beam, a second split combined beam, and a third split combined beam by non-polarization beam splitters 902 and 903. Among them, the first split combined beam passes through a phase plate 904 at which the s-polarized beam has a phase difference of 120° generated with respect to the p-polarized beam; the second split combined beam passes through a phase plate 905 at which the s-polarized beam has a phase difference of 240° generated with respect to the p-polarized beam; and the three split combined beams pass through polarizers 906, 907, and 908 that allow only 45° linearly polarized beams to pass therethrough, respectively, and are focused by condenser lenses 909, 910, and 911, and are further detected by detectors 912, 913, and 914. Outputs 915, 916, and 917 of such detectors are represented as follows.

$$I_1 = \left| \frac{1}{\sqrt{3}} E_{sig} + \frac{1}{\sqrt{3}} E_{ref} \right| \quad (7)$$

$$= \frac{1}{3}|E_{sig}|^2 + \frac{1}{3}|E_{ref}|^2 + \frac{2}{3}|E_s||E_r|\cos(\theta_{sig} - \theta_{ref})$$

$$I_2 = \left| \frac{1}{\sqrt{3}} E_{sig} + \frac{1}{\sqrt{3}} e^{\frac{\pi}{3}j} E_{ref} \right| \quad (8)$$

$$= \frac{1}{3}|E_{sig}|^2 + \frac{1}{3}|E_{ref}|^2 + \frac{2}{3}|E_s||E_r|\cos\left(\theta_{sig} - \theta_{ref} - \frac{\pi}{3}\right)$$

$$I_3 = \left| \frac{1}{\sqrt{3}} E_{sig} + \frac{1}{\sqrt{3}} e^{\frac{2\pi}{3}j} E_{ref} \right| \quad (9)$$

$$= \frac{1}{3}|E_{sig}|^2 + \frac{1}{3}|E_{ref}|^2 + \frac{2}{3}|E_s||E_r|\cos\left(\theta_{sig} - \theta_{ref} - \frac{2\pi}{3}\right)$$

By performing operation of the following formula on such signals, it is possible to obtain a signal that is independent of the interference phase.

$$|E_s||E_r| = \sqrt{\left(I_1 - \frac{I_2 - I_3}{2}\right)^2 + 3\left(\frac{I_2 - I_3}{2}\right)^2} \quad (10)$$

Embodiment 3

Figure 10:
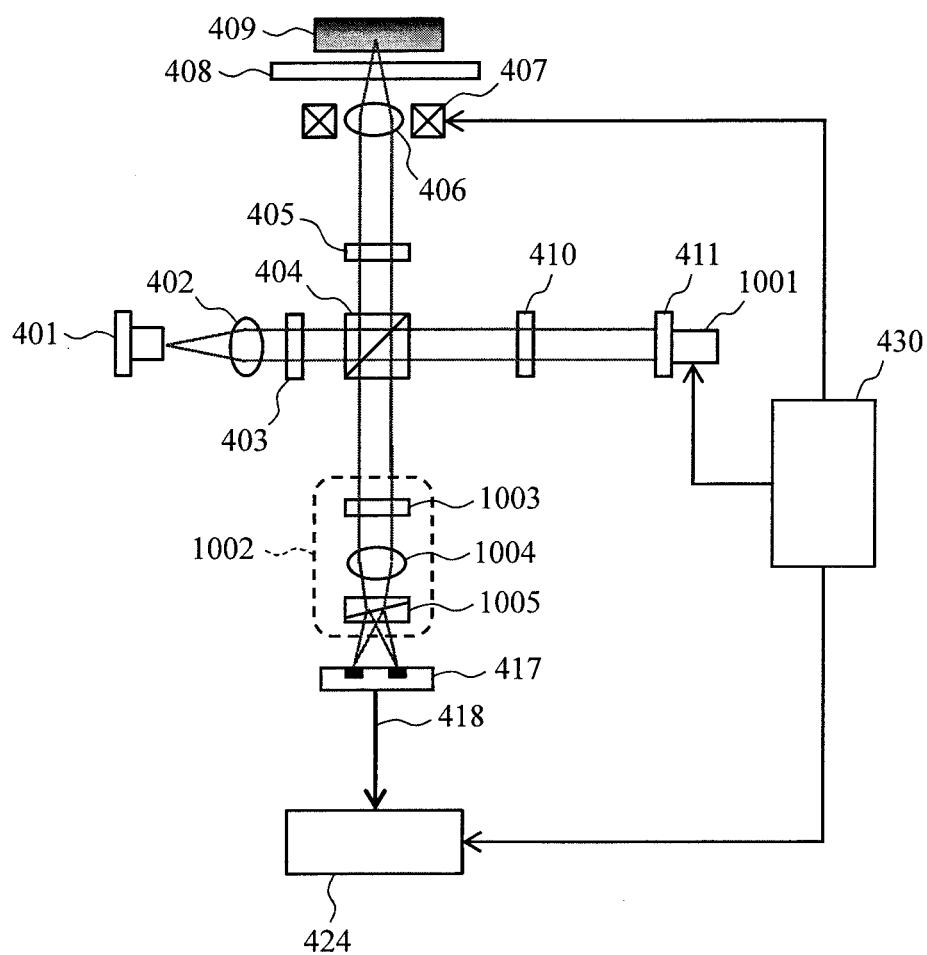
FIG. 10 is a schematic diagram showing another exemplary configuration of the optical measuring apparatus of the present invention.

FIG. 10 is a schematic diagram showing another embodiment of the present invention. It should be noted that members that are the same as those shown in FIG. 4 are denoted by the same reference numerals, and description thereof will be omitted.

A laser beam emitted from a light source 401 is converted into a collimated beam by a collimator lens 402, and is then subjected to polarization rotation by a λ/2 plate 403, and is further split into two: a signal beam and a reference beam by a polarization beam splitter 404. The signal beam passes through a λ/4 plate 405 so that it is converted from the s-polarized beam into a circularly polarized beam, and is then focused by a lens 406 with a numerical aperture of greater than or equal to 0.4. Then, the signal beam passes through a cover glass 408 and irradiates a target to be measured 409. Herein, a signal beam reflected by or scattered by the target to be measured 409 is converted into a collimated beam by the lens 406, and is converted from the circularly polarized beam into a p-polarized beam by the λ/4 plate 405. Then, the signal beam enters the polarization beam splitter 404.

Meanwhile, the reference beam passes through a λ/4 plate 410, and is converted from the p-polarized beam into a circularly polarized beam. Then, the reference beam becomes incident on and is reflected by a mirror 411 that is fixed to a piezo element 1001 through adhesion. Then, the reference beam passes through the λ/4 plate 410, and is converted from the circularly polarized beam into a s-polarized beam, and then enters the polarization beam splitter 404.

The signal beam and the reference beam are multiplexed by the polarization beam splitter 404, whereby a combined beam is generated. The combined beam is guided to interference optics 1002 that include a 212 plate 1003, a condenser lens 1004, and a Wollaston prism 1005. The combined beam passes through the λ/2 plate 1003 at which the optical axis is set at about 22.5° with respect to the horizontal direction, and is then focused by the condenser lens 1004. Then, the combined beam is split into two by the Wollaston prism 1005, whereby a first interference beam and a second interference beam having a phase difference of 180° are generated. The first interference beam and the second interference beam are detected by a current differential photodetector 417, and a signal 418 that is proportional to the intensity difference between the two beams is output. The output signal herein is represented by the following formula.

$$I = 4|E_{sig}||E_{ref}|\cos(\theta_{sig} - \theta_{ref}) \quad (11)$$

In this embodiment, the piezo element 1001 is driven during the measurement to modulate the position of the mirror 411, whereby the optical path length of the reference beam is modulated at a faster speed than a change in the optical path length of the signal beam that would occur due to the movement of the lens 406. Accordingly, the detected interference signals can be demodulated into a desired signal through envelope detection. Thus, functions that are similar to those in Embodiment 1 can be implemented using less detectors than in Embodiment 1.

Embodiment 4

Figure 11:
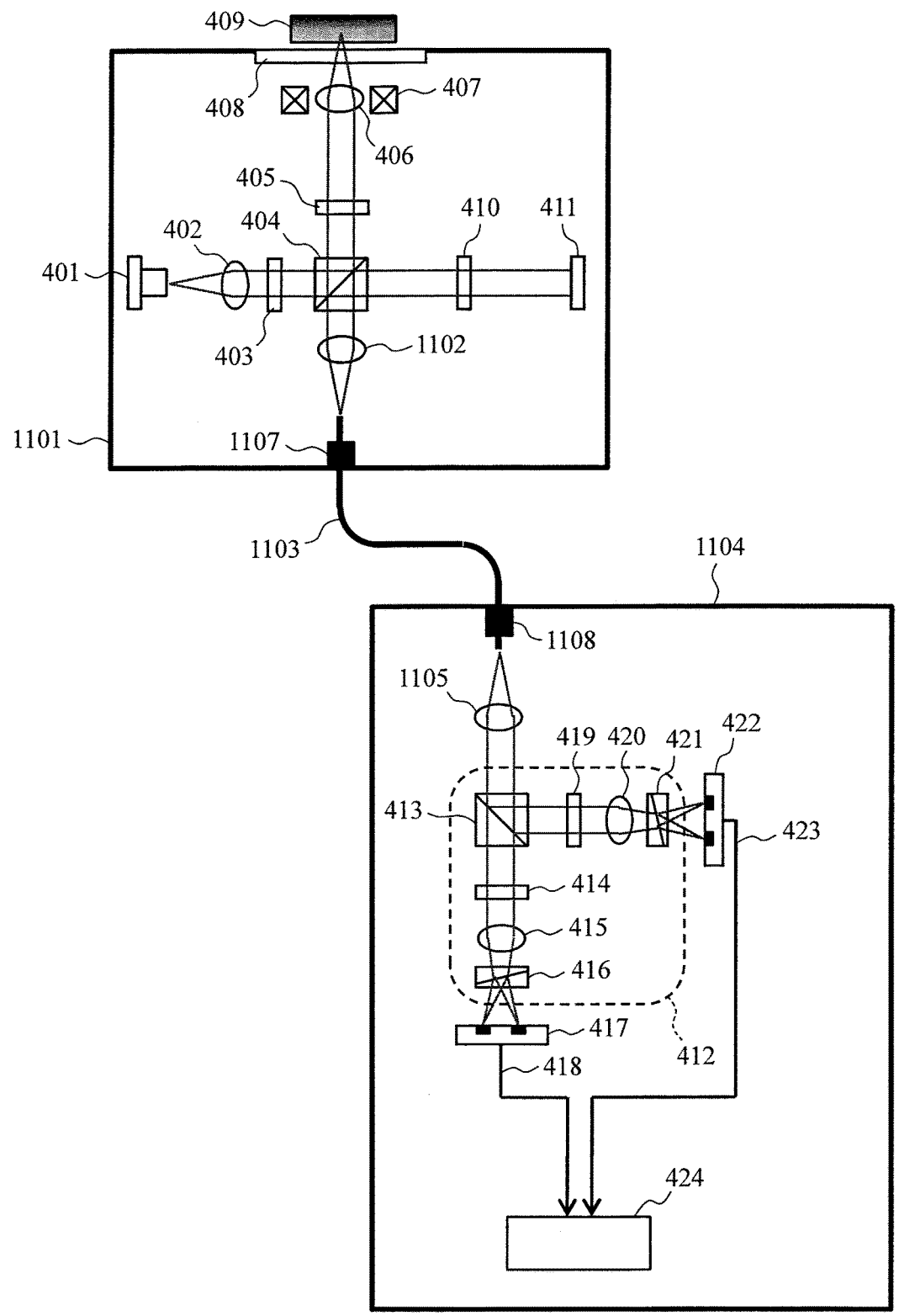
FIG. 11 is a schematic diagram showing another exemplary configuration of the optical measuring apparatus of the present invention.

FIG. 11 is a schematic diagram showing another embodiment of the present invention. It should be noted that members that are the same as those shown in FIG. 4 are denoted by the same reference numerals, and description thereof will be omitted.

The optical measuring apparatus in this embodiment includes an optical observation unit 1101, a photodetector unit 1104, and a polarization maintaining optical fiber 1103 connecting them. The polarization maintaining optical fiber 1103 is removably fixed to a fiber connecting portion 1107 of the optical observation unit 1101 and a fiber connecting portion 1108 of the photodetector unit 1104. This embodiment is the same as Embodiment 1 in the structure and function in which a laser beam emitted from a light source 401 is split into two, and the split beams are multiplexed again to generate a combined beam. The generated combined beam is coupled to the polarization maintaining optical fiber 1103 by a condenser lens 1102. The combined beam transmitted to the photo detector unit 1104 by the polarization maintaining optical fiber 1103 is converted into a collimated beam by a collimator lens 1105, and then enters interference optics 412. The configurations and functions of the units following the interference optics 412 are the same as those in Embodiment 1. Thus, description thereof will be omitted.

In this embodiment, the photodetector unit 1104 and the optical observation unit 1101 are connected with the polarization maintaining optical fiber 1103. Thus, when a large target to be measured, such as a human body, is measured, the measurement can be performed by moving only the optical observation unit 1101 closer to the target to be measured 409, and thus the measurement becomes easier. In addition, as the polarization maintaining optical fiber 1103 can be easily attached or detached, it is possible to replace only the photodetector unit when the photodetector unit fails, for example. Thus, replacement of the whole apparatus is not necessary.

Embodiment 5

Figure 12:
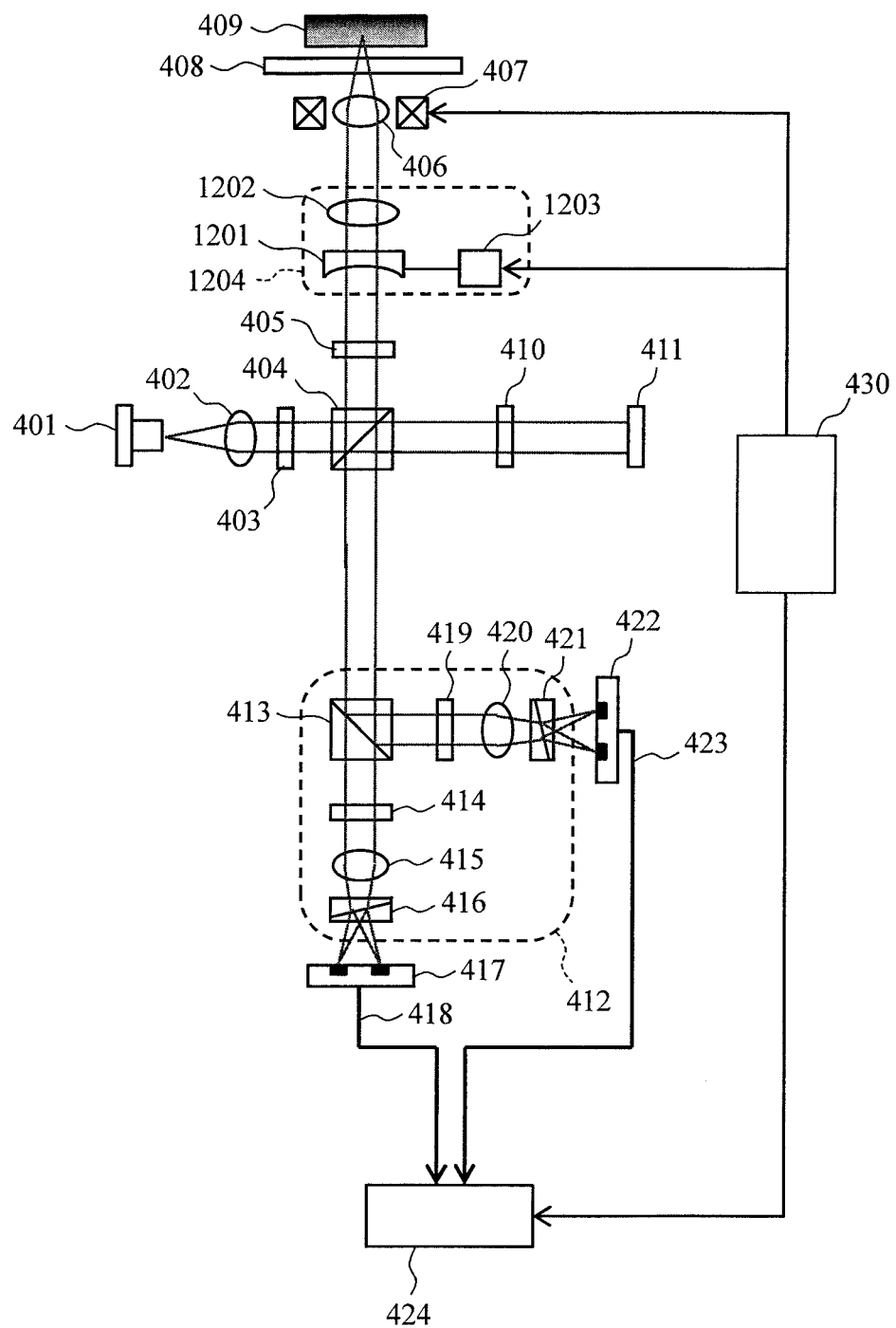
FIG. 12 is a schematic diagram showing another exemplary configuration of the optical measuring apparatus of the present invention.

FIG. 12 is a schematic diagram showing another embodiment of the present invention. It should be noted that members that are the same as those shown in FIG. 4 are denoted by the same reference numerals, and description thereof will be omitted.

This embodiment differs from Embodiment 1 in that a spherical aberration correction unit 1204, which includes first and second correction lenses 1201 and 1202 and a correction motor 1203, is provided on the optical path of the signal beam. The spherical aberration correction unit 1204 is adapted to correct spherical aberrations of a signal beam that are generated in the target to be measured. Specifically, the position of the first correction lens 1201 in the optical axis direction is changed by the correction motor 1203 that is controlled by the control unit 430, and the relative positional relationship between the first correction lens 1201 and the second correction lens 1202 is thus changed, whereby spherical aberrations are corrected. In this embodiment, two lenses are used as the spherical aberration correction means. However, it is also possible to use liquid crystal optical elements and the like. The configurations and functions of the components other than the spherical aberration correction unit 1204 are similar to those in Embodiment 1. Thus, description thereof will be omitted herein.

In this embodiment, spherical aberrations can be corrected. Thus, it is possible to suppress degradation of S/N and a decrease in the spatial resolution due to a decrease in the signal intensity even at a deep portion of the target to be measured. Thus, it is possible to suppress degradation of an image of a deep portion of the target to be measured.

It should be noted that the present invention is not limited to the aforementioned embodiments, and includes a wide variety of variations. For example, although the aforementioned embodiments have been described in detail to clearly illustrate the present invention, the present invention need not include all of the configurations described in the embodiments. It is possible to replace a part of a configuration of an embodiment with a configuration of another embodiment. In addition, it is also possible to add, to a configuration of an embodiment, a configuration of another embodiment. Further, it is also possible to, for a part of a configuration of each embodiment, add, remove, or substitute another configuration.

REFERENCE SIGNS LIST

401 Light source
403, 414 λ/2 plate
404 Polarization beam splitter
405, 410, 419 λ/4 plate
406 Lens
407 Lens actuator
408 Cover glass
409 Target to be measured
412, 801, 901, 1002 Interference optics
413 Half beam splitter
416, 421 Wollaston prism
417, 422 current differential photodetector
424 Signal processing unit
802 Diffraction grating
1001 Piezo element
1101 Optical observation unit
1103 Polarization maintaining optical fiber
1104 Photodetector unit
1204 Spherical aberration correction unit

What is claimed is:

1. An optical measuring apparatus comprising:
   a light source configured to emit a laser beam;
   an optical splitter configured to split the laser beam into a first beam and a second beam;
   a lens configured to focus the first beam as a signal beam onto a target to be measured to irradiate the target to be measured with the signal beam;
   a light reflector configured to reflect the second beam as a reference beam without irradiating the target to be measured;
   a lens actuator configured to move the lens;
   a control unit configured to control the lens actuator to move a focus position of the first beam by moving the lens at least in an optical axis direction during measurement;
   interference optics configured to multiplex a signal beam reflected by or scattered by the target to be measured with the reference beam, thereby generating three or more interference beams with different phases; and
   a plurality of photodetectors configured to detect the interference beams,
   wherein the control unit is further configured to control the lens actuator to move the focus position of the first beam in the optical axis direction within a scanning range such that a coherence length of the laser beam is greater than or equal to a change in an optical path length of the signal beam.

2. The optical measuring apparatus according to claim 1, wherein the lens has a numerical aperture that is greater than or equal to 0.4.

3. The optical measuring apparatus according to claim 1, wherein a position of the light reflector is fixed during measurement.

4. The optical measuring apparatus according to claim 1, wherein
   the photodetectors include four photodetectors,
   an interference phase of the signal beam and the reference beam on each of the four photodetectors differs from one another by an integral multiple of substantially 90°, and pairs of interference beams are detected by a current differential detector, each pair having a difference of substantially 180° in the interference phase of the signal beam and the reference beam.

5. The optical measuring apparatus according to claim 1, wherein
the control unit is configured to control the lens actuator so that movement of the focus position of the first beam is repeated in the optical axis direction.

6. The optical measuring apparatus according to claim 5, wherein the control unit is configured to control lens actuator so that the focus position returns in the optical axis direction at a position beyond an observation target area of the target to be measured.

7. The optical measuring apparatus according to claim 5, further comprising:
a cover glass between the lens and the target to be measured, wherein
the control unit is configured to control the lens actuator so that a surface of the cover glass is included in a movement range of the focus position in the optical axis direction, and
an observed image is corrected using a signal from the surface of the cover glass.

8. The optical measuring apparatus according to claim 5, wherein an intensity of the laser beam in an area around a return position of the repetitive movement of the focus position in the optical axis direction is set lower than when the focus position is outside the area around the return position.

9. The optical measuring apparatus according to claim 5, wherein power of the laser beam is set to zero around the return position of the repetitive movement of the focus position in the optical axis direction.

10. The optical measuring apparatus according to claim 5, wherein the laser beam is pulse-modulated so that light emission occurs in synchronism with a signal acquisition timing.

11. An observation unit comprising:
a light source configured to emit a laser beam;
an optical splitter configured to split the laser beam into a first beam and a second beam;
a lens configured to focus the first beam as a signal beam onto a target to be measured to irradiate the target to be measured with the signal beam;
a light reflector configured to reflect the second beam as a reference beam without irradiating the target to be measured;
a lens actuator configured to move the lens;
a control unit configured to control the lens actuator to move a focus position of the first beam by moving the lens at least in an optical axis direction during measurement;
an optical fiber connection unit having an optical fiber connected thereto; and
optics configured to cause a combined beam to enter the optical fiber connected to the optical fiber connection unit, the combined beam having been generated by multiplexing the signal beam with the reference beam by multiplexing a signal beam reflected by or scattered by a target to be measured with the reference beam,
wherein the control unit is further configured to control the lens actuator to move the focus position of the first beam in the optical axis direction within a scanning range such that a coherence length of the laser beam is greater than or equal to a change in an optical path length of the signal beam.

12. An optical measuring apparatus comprising:
a light source configured to emit a laser beam;
an optical splitter configured to split the laser beam into a first beam and a second beam;
a lens configured to focus the first beam as a signal beam onto a target to be measured to irradiate the target to be measured with the signal beam;
a light reflector configured to reflect the second beam as a reference beam without irradiating the target to be measured;
a lens actuator configured to move the lens;
a control unit configured to control the lens actuator to move a focus position of the first beam by moving the lens in an optical axis direction during measurement;
an optical path length modulation unit configured to modulate an optical path length of the reference beam at a faster speed than a change in an optical path length of the signal beam that occurs due to the movement of the focus position of the first beam; and
a photodetector configured to detect a beam that is obtained by multiplexing a signal beam reflected by or scattered by the target to be measured with the reference beam,
wherein the control unit is further configured to control the lens actuator to move the focus position of the first beam in the optical axis direction within a scanning range such that a coherence length of the laser beam is greater than or equal to a change in an optical path length of the signal beam.

13. The optical measuring apparatus according to claim 12, wherein the optical path length modulation unit includes a piezo element.

14. An optical measuring apparatus comprising:
a light source configured to emit a laser beam;
an optical splitter configured to split the laser beam into a first beam and a second beam;
a lens configured to focus the first beam as a signal beam onto a target to be measured to irradiate the target to be measured with the signal beam;
a spherical aberration correction unit arranged on an optical path of the first beam;
a light reflector configured to reflect the second beam as a reference beam without irradiating the target to be measured;
a lens actuator configured to move the lens;
a control unit configured to control the lens actuator to move a focus position of the first beam by moving the lens at least in an optical axis direction during measurement;
interference optics configured to multiplex a signal beam reflected by or scattered by the target to be measured with the reference beam, thereby generating three or more interference beams with different phases; and
a plurality of photodetectors configured to detect the interference beams,
wherein the control unit is further configured to control the lens actuator to move the focus position of the first beam in the optical axis direction within a scanning range such that a coherence length of the laser beam is greater than or equal to a change in an optical path length of the signal beam.

* * * * *